US 11,748,971 B2

(12) United States Patent
Kumaresan et al.

(10) Patent No.: US 11,748,971 B2
(45) Date of Patent: Sep. 5, 2023

(54) METHOD AND SYSTEM FOR IDENTIFYING PRODUCTS USING DIGITAL FINGERPRINTS

(71) Applicant: Wipro Limited, Bangalore (IN)

(72) Inventors: Senthil Kumar Kumaresan, Bangalore (IN); Aditya Bhola, Bangalore (IN); Gurdeep Virdi, Bangalore (IN)

(73) Assignee: WIPRO LIMITED, Karnataka (IN)

( * ) Notice: Subject to any disclaimer, the term of this patent is extended or adjusted under 35 U.S.C. 154(b) by 198 days.

(21) Appl. No.: 17/329,546

(22) Filed: May 25, 2021

(65) Prior Publication Data

US 2022/0318561 A1 Oct. 6, 2022

(30) Foreign Application Priority Data

Mar. 30, 2021 (IN) .............................. 202141014381

(51) Int. Cl.
*G06V 10/32* (2022.01)
*G06V 10/40* (2022.01)
(Continued)

(52) U.S. Cl.
CPC .............. *G06V 10/32* (2022.01); *G06V 10/24* (2022.01); *G06V 10/25* (2022.01); *G06V 10/26* (2022.01);
(Continued)

(58) Field of Classification Search
CPC ...... G06V 10/32; G06V 10/40; G06V 10/751; G06V 10/24; G06V 10/25; G06V 10/26;
(Continued)

(56) References Cited

U.S. PATENT DOCUMENTS

| 2014/0140571 A1* | 5/2014 | Elmenhurst | G06F 16/2468 382/101 |
| 2017/0236183 A1* | 8/2017 | Klein | G06F 18/24147 705/26.7 |
| 2018/0349694 A1* | 12/2018 | Ross | G06T 7/90 |

FOREIGN PATENT DOCUMENTS

| CN | 107403128 A | * 11/2017 | .......... G06K 7/1417 |
| WO | 2016097968 A1 | 6/2016 | |

OTHER PUBLICATIONS

Sharma, A., Kanchan, V., Srinivasan, V., Subramanian, L., "The Fake vs Real Good Problem: Microscopy and Machine Learning to the Rescue," KDD 2017 Applied Data Science Paper, 2017, p. 2011-2019. (Year: 2017).*

(Continued)

*Primary Examiner* — Amandeep Saini
*Assistant Examiner* — Daniella M. DiGuglielmo
(74) *Attorney, Agent, or Firm* — Finnegan, Henderson, Farabow, Garrett & Dunner, LLP

(57) ABSTRACT

This disclosure relates to a method and system for identifying products using digital fingerprints. The method includes receiving, by a product tracking system, a set of images corresponding to a product, wherein the set of images are received along with associated context information. The method generates a set of standardized images by pre-processing the set of images. Each standardized image of the set of standardized images are further segmented into a plurality of zones. A zone wise fingerprint is generated for each zone of the plurality of zones. A product digital fingerprint is generated for the product by combining zone wise fingerprints associated with the set of standardized images, wherein the product digital fingerprint identifies the product.

14 Claims, 4 Drawing Sheets

(51) Int. Cl.
*G06V 10/24* (2022.01)
*G06V 10/25* (2022.01)
*G06V 10/26* (2022.01)
*G06V 30/10* (2022.01)
*G06V 10/75* (2022.01)
*G06V 10/56* (2022.01)
*G06V 10/62* (2022.01)
*G06V 20/80* (2022.01)

(52) U.S. Cl.
CPC .............. *G06V 10/40* (2022.01); *G06V 30/10* (2022.01); *G06V 10/56* (2022.01); *G06V 10/62* (2022.01); *G06V 10/751* (2022.01); *G06V 20/80* (2022.01)

(58) Field of Classification Search
CPC ........ G06V 10/56; G06V 10/62; G06V 30/10; G06V 20/80
See application file for complete search history.

(56) References Cited

OTHER PUBLICATIONS

Mahieu P., Genin X., Bouché C., Brismalein D., Pédroli H., "Carbon Block Tracking Package Based on Vision Technology," Light Metals 2019. The Minerals, Metals & Materials Series. Springer, Cham. (2019), available at https://doi.org/10.1007/978-3-030-05864-7_150 (3 pages).

* cited by examiner

METHOD AND SYSTEM FOR IDENTIFYING PRODUCTS USING DIGITAL FINGERPRINTS

TECHNICAL FIELD

This disclosure relates generally to identifying products, and more particularly to a method and system for identifying products using digital fingerprints.

BACKGROUND

Products manufactured in a manufacturing industry are typically marked with product identifiers (IDs), for example an alphanumeric code is marked on top of each product. A product ID helps in tracking of a product. However, at times, the product IDs on the products are either partially or completely non-readable, which further makes the tracking of the products difficult.

With the products not being able to be tracked, there would be critical gaps on product data, thereby making upstream analytics difficult and inaccurate. Most times, manufacturers may have to produce additional products, due to lack of reliable tracking of the products. Such products cannot be tracked using conventional radio frequency identification (RFID) markers, laser markings, or ceramic tags. Optical character recognition (OCR) methods are also difficult to be applied for reading the product IDs as some of the products are manufactured under extreme conditions.

In some existing methods, tracking of the products are done manually which is both time consuming and error prone. In other methods, vision technology is used to identify and recognize a signature on surface of each product. However, in this case, accuracy of comparison is low, when this solution is deployed at scale to identify more number of products.

Hence, there is a need for a robust and efficient method for accurately tracking and identifying the products.

SUMMARY

In one embodiment, a method of identifying products using digital fingerprints is disclosed. In one example, the method includes receiving, by a product tracking system, a set of images corresponding to a product, wherein the set of images are received along with associated context information. The method may further include generating, by the product tracking system, a set of standardized images by pre-processing the set of images. Each standardized image of the set of standardized images is segmented into a plurality of zones. A zone wise fingerprint is subsequently generated for each zone of the plurality of zones. The method further includes generating a product digital fingerprint for the product by combining zone wise fingerprints associated with the set of standardized images, wherein the product digital fingerprint identifies the product.

In one embodiment, a product tracking system for identifying products using digital fingerprints is disclosed. In one example, the product tracking system may include a processor and a memory communicatively coupled to the processor. The memory stores processor instructions, which, on execution, causes the processor to receive a set of images corresponding to a product, wherein the set of images are received along with associated context information. The processor instructions, on execution, further causes the processor to generate a set of standardized images by pre-processing the set of images, to segment each standardized image of the set of standardized images into a plurality of zones, and to generate a zone wise fingerprint for each zone of the plurality of zones. The processor instructions, on execution, further causes the processor to generate a product digital fingerprint for the product by combining zone wise fingerprints associated with the set of standardized images, wherein the product digital fingerprint identifies the product.

In one embodiment, a non-transitory computer-readable storage medium for identifying products using digital fingerprints, having stored thereon, a set of computer-executable instructions causing a computer comprising one or more processors to perform steps including receiving a set of images corresponding to a product, wherein the set of images are received along with associated context information. The set of computer-executable instructions further cause the one or more processors to perform steps including generating a set of standardized images by pre-processing the set of images, segmenting each standardized image of the set of standardized images into a plurality of zones, generating a zone wise fingerprint for each zone of the plurality of zones, and generating a product digital fingerprint for the product by combining zone wise fingerprints associated with the set of standardized images, where the product digital fingerprint identifies the product.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
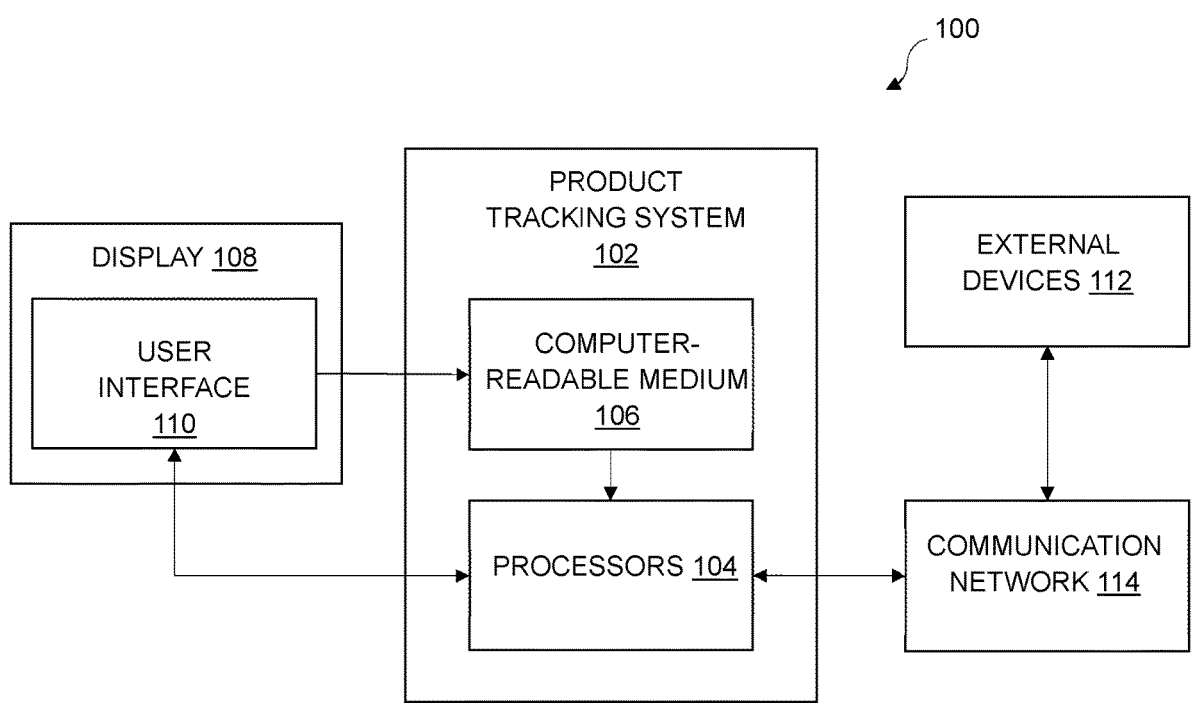
FIG. 1 is a block diagram of an exemplary system for identifying products using digital fingerprints, in accordance with some embodiments.

Referring now to FIG. 1, an exemplary system 100 for identifying products using digital fingerprints is illustrated, in accordance with some embodiments. In particular, the system 100 may include a product tracking system 102 (for example, server, desktop, laptop, notebook, netbook, tablet, smartphone, mobile phone, or any other computing device) that identifies the products using the digital fingerprints.

As will be described in greater detail in conjunction with FIGS. 2-3, the product tracking system 102 receives a set of images corresponding to a product. It may be noted that the set of images are received along with associated context information. A set of standardized images are generated by pre-processing the set of images. Each standardized image of the set of standardized images is segmented into a plurality of zones. A zone wise fingerprint is generated for each zone of the plurality of zones. A product digital fingerprint is generated for the product by combining zone wise fingerprints associated with the set of standardized images. It may be noted that the product digital fingerprint identifies the product.

In some embodiments, the product tracking system 102 includes one or more processors 104 and a computer-readable medium 106 (for example, a memory). The computer-readable medium 106 can generate an output (e.g. a product digital fingerprint) for an input data (e.g. a set of images corresponding to a product). Further, the computer-readable storage medium 106 may store instructions that, when executed by the one or more processors 104, cause the one or more processors 104 to identify products using digital fingerprints by combining zone wise fingerprints associated with a set of standardized images, in accordance with aspects of the present disclosure. The computer-readable storage medium 106 may also store various data (for example, the set of images, context information, zone wise fingerprints, and the like) that may be captured, processed, and/or required by the system 100.

The system 100 may further include a display 108. The system 100 may interact with a user via a user interface 110 accessible via the display 108. The system 100 may also include one or more external devices 112. In some embodiments, the product tracking system 102 may interact with the one or more external devices 112 over a communication network 114 for sending or receiving various data. The external devices 112 may include, but may not be limited to, a remote server, a digital device, or another computing system.

Figure 2:
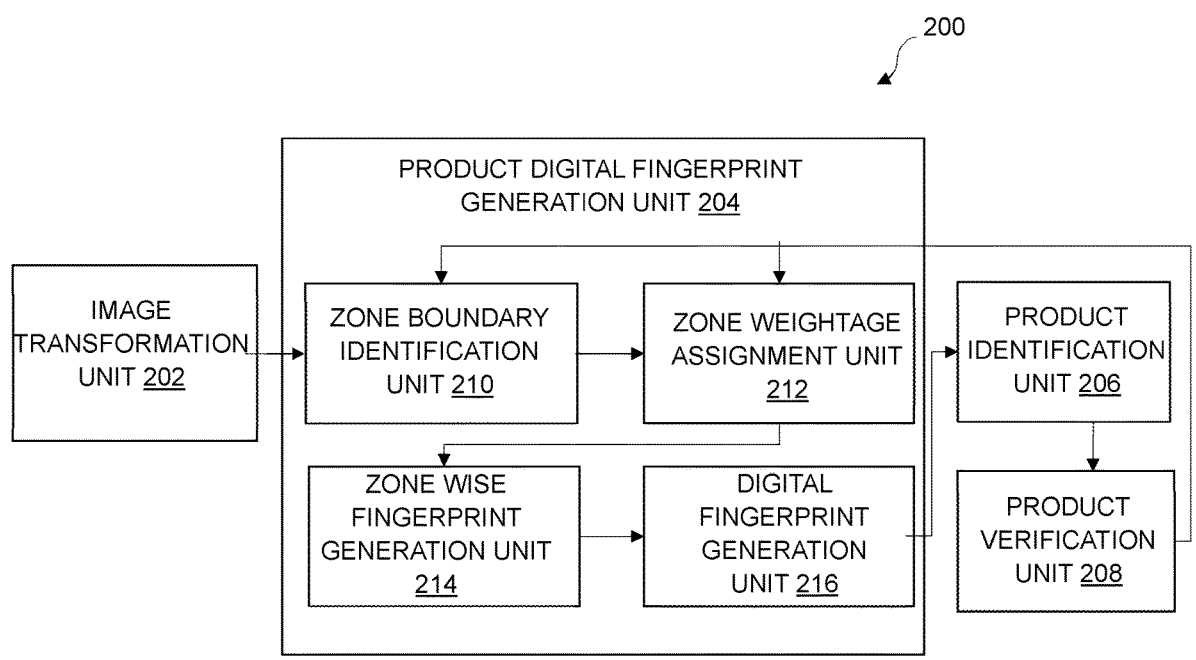
FIG. 2 is a functional block diagram of a product tracking system implemented by the exemplary system of FIG. 1, in accordance with some embodiments.

Referring now to FIG. 2, a functional block diagram of a product tracking system 200 (analogous to the product tracking system 102 implemented by the system 100) is illustrated, in accordance with some embodiments.

The product tracking system 200 includes an image transformation unit 202, a product digital fingerprint generation unit 204, a product identification unit 206, and a product verification unit 208. The product digital fingerprint generation unit 204 includes a zone boundary identification unit 210, a zone weightage assignment unit 212, a zone-wise fingerprint generation unit 214, and a digital fingerprint generation unit 216.

The image transformation unit 202 receives a set of images corresponding to a product along with associated context information. In some embodiments, the set of images are received from an image-capturing unit (not shown in FIG. 2). After receiving the information, the image transformation unit 202 transforms the set of images of the product by pre-processing the set of images to generate a set of standardized images. In some embodiments, geometric image standardization methods are used to pre-process the set of images. Further, the image transformation unit 202 extracts a product identifier (ID) corresponding to the product from the set of images. The product ID along with the set of standardized images are transmitted to the zone boundary identification unit 210.

The product digital fingerprint generation unit 204 is configured to receive the information from the image transformation unit 202. In an embodiment, the product digital fingerprint generation unit 204 includes the zone boundary identification unit 210, the zone weightage assignment unit 212, the zone wise fingerprint generation unit 214, and the digital fingerprint generation unit 216.

The zone boundary identification unit 210 is configured to receive the product ID extracted from the set of images along with the set of standardized images from the image transformation unit 202. The zone boundary identification unit 210 is configured to segment each standardized image of the set of standardized images into a plurality of zones. In an embodiment, each standardized image is segmented into the zones based on rules defined by a domain expert. Once the product tracking system 200 is trained with an increased number of standardized images and accurate product identification rates, the zone boundary identification unit 210 is configured to utilize machine-learning techniques to dynamically create the zones on the standardized image. Further, the zone boundary identification unit 210 is configured to transmit the product ID, and zone information to the zone weightage assignment unit 212.

The zone weightage assignment unit 212 is configured to receive the product ID and the zones from the zone boundary identification unit 210. Once the zones are identified, the zone weightage assignment unit 212 is configured to assign weights dynamically for each of the zones by analyzing historical data. In some embodiments, the weights assigned to the zones are not equal. Some of the zones may carry more weight and some zones may carry less weight, to enable accuracy of product identification. The weights are assigned based on the historical analysis and domain knowledge, feedback of accuracy of the product identification and re-trained model. Further, the zone weightage assignment unit 212 is configured to transmit the product ID, the zone information and associated zone weightage information to the zone wise fingerprint generation unit 214.

The zone wise fingerprint generation unit 214 is configured to receive the product ID, the zone information and the zone weightage information from the zone weightage assignment unit 212. Further, the zone wise fingerprint generation unit 214 is configured to generate the zone wise fingerprint for each zone based on the product ID, the zone information, and the zone weightage information. Further, the zone wise fingerprint generation unit 214 is configured to send the product ID, the zone information, the zone weightage information, and zone wise fingerprints to the digital fingerprint generation unit 216.

The digital fingerprint generation unit 216 is configured to receive the product ID, the zone information, the zone weightage information, and the zone wise fingerprints from the zone wise fingerprint generation unit 214. Once the zone wise fingerprints are generated for each zone, the digital fingerprint generation unit 216 is configured to combine the zone wise fingerprints to generate a product digital fingerprint for the product. In an embodiment, the product digital fingerprint identifies the product. Further, the digital fingerprint generation unit 216 is configured to transmit the product ID, the product digital fingerprint, the zone information, the zone weightage information, and the zone wise fingerprints to the product identification unit 206.

The product identification unit 206 receives the product ID, the product digital fingerprint, the zone information, the zone weightage information, and the zone wise fingerprints from the digital fingerprint generation unit 216. In an embodiment, the product identification unit 206 is configured to identify the product by comparing the product digital fingerprint against product digital fingerprints that are maintained in a master data repository (not shown in FIG. 2). The product identification unit 206 provides the product ID of the identified product once a match of the digital product fingerprints between two products are found. The product identification unit 206 transmits the product ID and the product ID of the identified product, to the product verification unit 208.

The product verification unit 208 is configured to receive the product ID and the product ID of the identified product from the product identification unit 206. The product verification unit 208 is configured to verify accuracy of product identification. A set of parameters associated with the product tracking system 200 is modified based on verification. In some embodiments, depending upon accuracy of the product identification, the product verification unit 208 is configured to transmit the accuracy of the product identification to the zone boundary identification unit 210 and the zone weightage assignment unit 212 to retrain one or more machine learning models used in the zone boundary identification unit 210 and the zone weightage assignment unit 212 by modifying the set of parameters.

It should be noted that all such aforementioned modules 202-216 may be represented as a single module or a combination of different modules. Further, as will be appreciated by those skilled in the art, each of the modules 202-216 may reside, in whole or in parts, on one device or multiple devices in communication with each other. In some embodiments, each of the modules 202-216 may be implemented as dedicated hardware circuit comprising custom application-specific integrated circuit (ASIC) or gate arrays, off-the-shelf semiconductors such as logic chips, transistors, or other discrete components. Each of the modules 202-216 may also be implemented in a programmable hardware device such as a field programmable gate array (FPGA), programmable array logic, programmable logic device, and so forth. Alternatively, each of the modules 202-216 may be implemented in software for execution by various types of processors (e.g., processors 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for identifying products using digital fingerprints. For example, the exemplary system 100 and the associated product tracking system 102, 200 may identify products using digital fingerprints by the processes discussed herein. In particular, as will be appreciated by those of ordinary skill in the art, control logic and/or automated routines for performing the techniques and steps described herein may be implemented by the system 100 and the associated product tracking system 102, 200 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
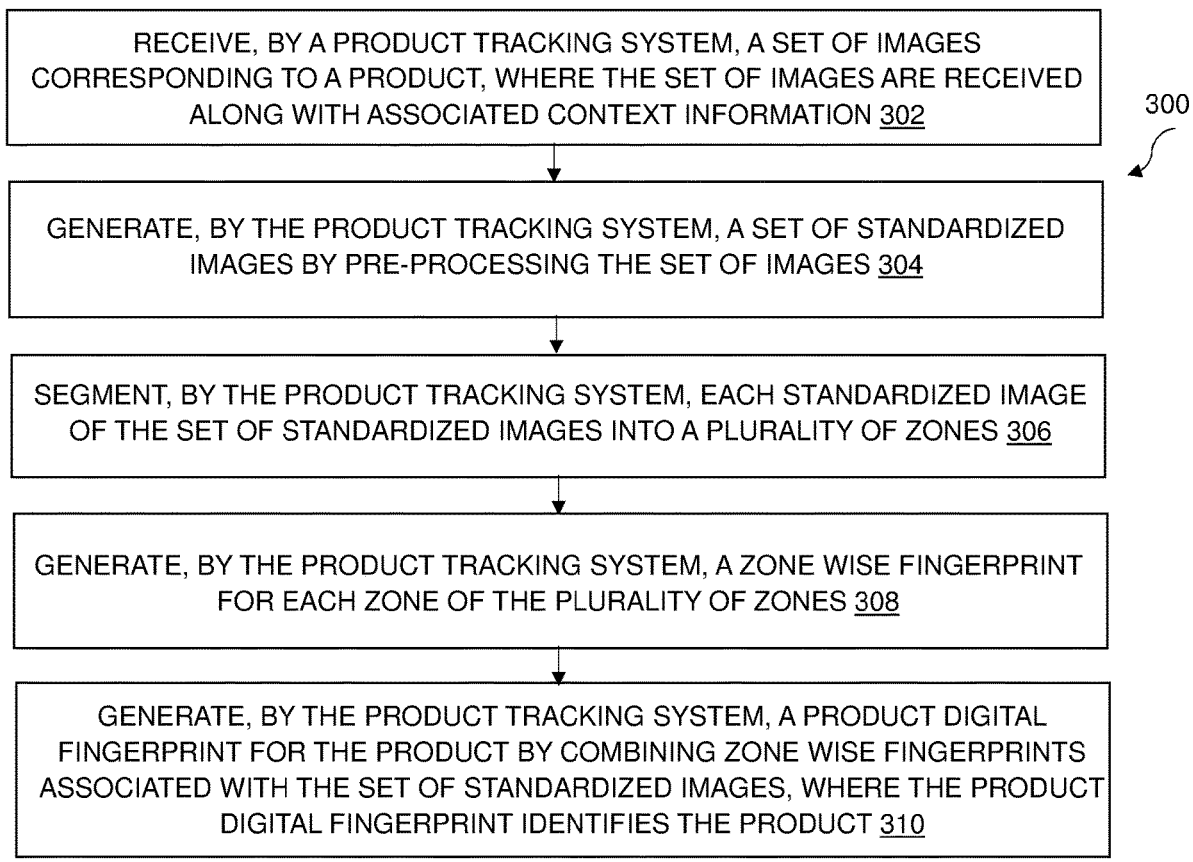
FIG. 3 illustrates a flow diagram of an exemplary method of identifying products using digital fingerprints, in accordance with some embodiments.

Referring now to FIG. 3, a flow diagram of an exemplary method 300 of identifying products using digital fingerprints is depicted, in accordance with some embodiments of the present disclosure. In an embodiment, the method 300 may be implemented by the product tracking system 102 of the system 100. The method 300 may include receiving, by the product tracking system 102, a set of images corresponding to a product, at step 302. The set of images are received along with associated context information. In some embodiments, the set of images are received from an image capturing unit. By way of example, the image capturing unit is mounted to an assembly line of a product manufacturing process.

In some embodiments, the image transformation unit 202 communicates with the image capturing unit to receive the set of images at regular intervals. On receiving the set of images, the image transformation unit 202 transmits the set of images to a remote location for storage, for example a cloud storage. In some embodiments, the set of images are processed at an edge in order to extract a region of interest, zone information, and the like. In other embodiments, the set of images are processed dynamically based on different scenarios, for example available bandwidth, file size, or the like. In some embodiments, a location for processing the set of images is determined based on type of use case, current context of factory, conditions of the factory, size of the set of images, and the like.

At step 304, the method 300 includes generating, by the product tracking system 102, a set of standardized images by pre-processing the set of images. During generation of the set of standardized images, a product identifier (ID) corresponding to the product is extracted from the set of images. In some embodiments, the set of images are pre-processed using geometric image standardization methods.

In some embodiments, the geometric image standardization methods are used on the set of images to resize the set of images, and to conduct four-point perspective transformation to standardize each image of the set of images separately and create a top-down elevated view of each image. The top-down elevated view of each image is used by the product tracking system 102 in order to analyze each image independently and effectively. The set of standardized images are hence images with top-down elevated views.

In some embodiments, the set of images are pre-processed by checking each image of the set of images for image distortions and correctness, remapping each image, resizing each image, and finally performing a perspective transformation of each image to generate the set of standardized images.

At step 306, the method 300 includes segmenting, by the product tracking system 102, each standardized image of the set of standardized images into a plurality of zones. The product ID and the set of standardized images are received and each standardized image is segmented into the plurality of zones, for example by the zone boundary identification unit 210. In some embodiments, the zones are segmented using heuristics or rules of a rule-based method. By way of example, for a product ID "ABCD1234", a rule definition for segmenting the zones on a standardized image includes zone "Z00" having (X1, Y1) coordinates at (0, 10), (X2, Y2) coordinates at (0, 8), (X3, Y3) coordinates at (1, 10), and (X4, Y4) coordinates at (1, 8). Similarly, zone "Z01" has (X1, Y1) coordinates at (1, 10), (X2, Y2) coordinates at (1, 8), (X3, Y3) coordinates at (20, 10), and (X4, Y4) coordinates at (20, 8); zone "Z03" having (X1, Y1) coordinates at (20, 10), (X2, Y2) coordinates at (20, 8), (X3, Y3) coordinates at (25, 10), and (X4, Y4) coordinates at (25, 8); zone "Z10" having (X1, Y1) coordinates at (0, 8), (X2, Y2) coordinates at (0, 1), (X3, Y3) coordinates at (1, 8), and (X4, Y4) coordinates at (1, 1).

In some embodiments, each product includes the product ID imprinted at the top surface of the product. The standardized images are scanned to identify the zone which has the product ID. In an example, optical character recognition (OCR) method is applied to read and store the product ID. The product ID enables increase in accuracy of product identification.

At step 308, the method 300 includes generating, by the product tracking system 102, a zone wise fingerprint for each zone of the plurality of zones. The zone wise fingerprint is generated by first assigning weights to the plurality of zones based on historical data. The zone wise fingerprint is subsequently generated for each zone based on the product ID, zone information, and associated zone weightage information.

In some embodiments, a zone wise fingerprint is generated for a zone by performing a series of steps. In a first step, pixels of the standardized image are analyzed from top left using a sliding window analyzer. Secondly, a gray scaling method is used to convert the standardized image from RGB or HSV color spaces to shades of gray. Thirdly, thresholding, for example simple, adaptive, or Otsu Binarization, is performed. Depending on a threshold provided, an image matrix is formed to alternate between values of 0 and 255. A contouring method is further applied where patterns are drawn to various shapes. Further, clustering methods are used to group together individual patterns to form a cumulative pattern.

In some embodiments, the weights are assigned to the plurality of zones based on historical data or the heuristics that are defined as the rules. By way of example, the zone "Z00" has a weight of 8, the zone "Z01" has a weight of 10, the zone "Z03" has a weight of 8, and the zone "Z10" has a weight of 5.

At step 310, the method 300 includes generating, by the product tracking system 102, a product digital fingerprint for the product by combining zone wise fingerprints associated with the set of standardized images. The product digital fingerprint identifies the product.

In some embodiments, the product digital fingerprint is generated by combining the zone wise fingerprints which are multi-level fingerprints that are obtained by adding unique single level patterns to collaborative patterns across the zones. The multi-level fingerprints are generated using historical data and available statistical methods including Association Rule Mining or Collaborative Filtering.

In some embodiments, the product digital fingerprint can be generated using multiple methods. In a first method, surface of the product is scanned and identifiable regions of interest are created based on number of irregularities identified. Any number of regions of interest are identified to generate the product digital fingerprint. In a second method, the surface of the product is divided into multiple predefined zones as regions of interest. Each zone has unique patterns and characteristics. The zones can include a raised area, edges, the product ID, triangular insets and an additional finite number of virtual grids on the surface of the product. The zone wise fingerprint on each of the zones can be added to generate the product digital fingerprint for the product.

In some embodiments, a master repository of product digital fingerprints is maintained. The product is further identified by comparing the product digital fingerprint against the product digital fingerprints available in the master repository. In an example, a Sliding Window based Overlap Maximization method is used for comparison where zone wise fingerprints of each of the zones are compared against zone wise fingerprints in the master repository. In some embodiments, zone similarity is determined by estimating cumulative overlap among circular patterns between the zones of the product digital fingerprints of candidate products with that of the master repository. In some embodiments, the zone similarity and the zone weightages are combined to compute a product digital fingerprint similarity index of the product that has to be identified against other products in the master repository.

In some embodiments, the product is identified by maximizing a match of the product digital fingerprint similarity index by one of Rule based Maximization or adopting advanced Artificial Intelligence methods. In one embodiment, the product which has maximum similarity is identified if percentage similarity is maximum, or if percentage similarity is maximum and above a threshold value. In another embodiment, the product is identified based on certain conditions in addition to maximum similarity, for example the maximum similarity is x % more than the next highest similarity, or the maximum similarity is at least p more than mean of a similarities set. In another embodiment, the product is identified by calculating a confidence score based on all similarity values, and by using a maximum confidence approach using a threshold.

In some embodiments, accuracy of product identification is verified. Further, a set of parameters, for example zone information, zone weightage information, multi-zone cumulative fingerprints and the like, associated with the product tracking system is modified based on verification. The accuracy of the product identification is sent to the zone boundary identification unit 210 and the zone weightage assignment unit 212 to retrain one or more machine learning models used in the zone boundary identification unit 210 and the zone weightage assignment unit 212 by modifying the set of parameters.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
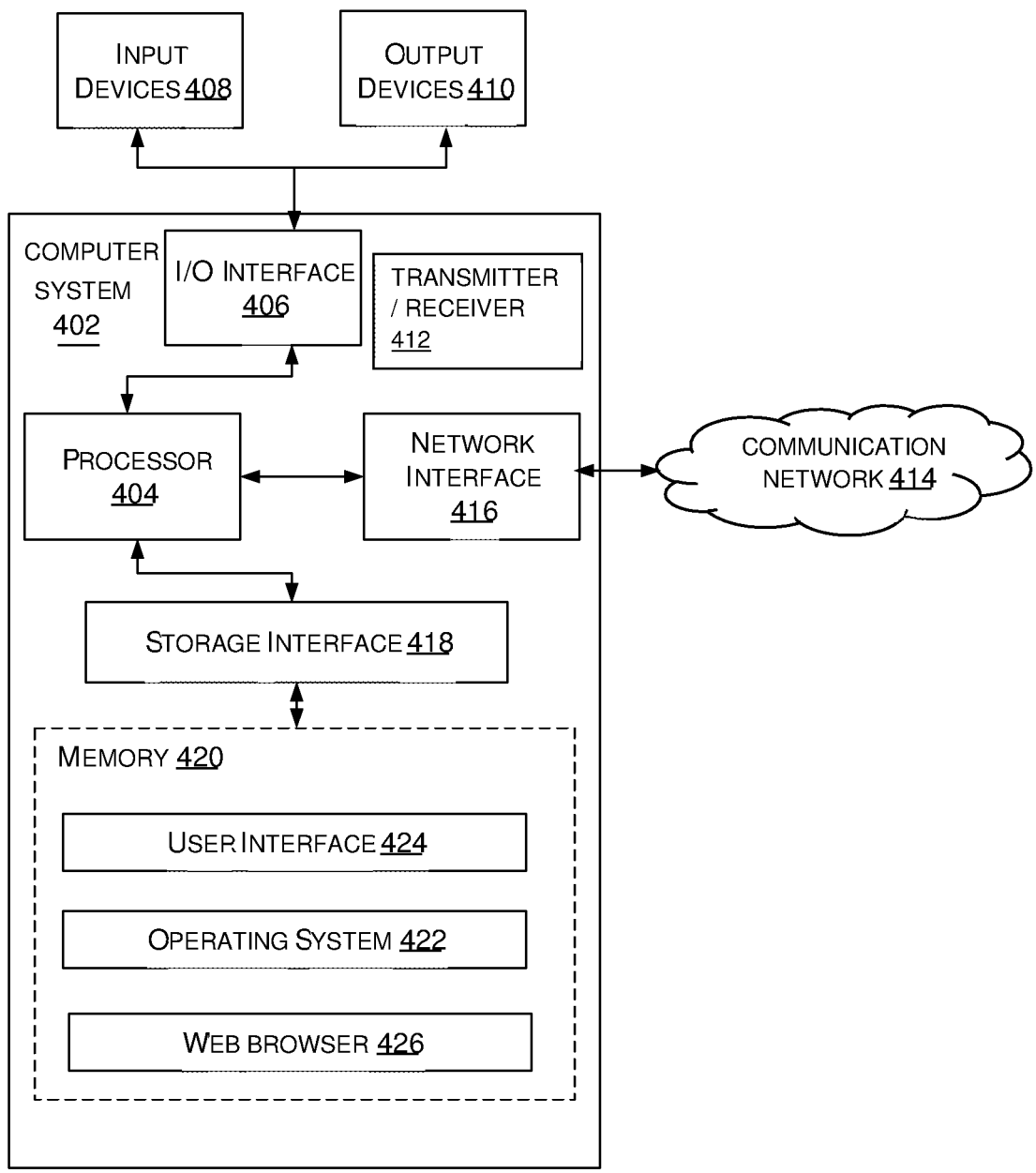
FIG. 4 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 402 for implementing embodiments consistent with the present disclosure is illustrated. Variations of computer system 402 may be used for implementing system 100 for building an ensemble model. Computer system 402 may include a central processing unit ("CPU" or "processor") 404. Processor 404 may include at least one data processor for executing program components for executing user-generated or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 404 may be disposed in communication with one or more input/output (I/O) devices via I/O interface 406. The I/O interface 406 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 406, the computer system 402 may communicate with one or more I/O devices. For example, the input device 408 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 410 may be a printer, fax machine, video display (e.g., cathode ray tube (CRT), liquid crystal display (LCD), light-emitting diode (LED), plasma, or the like), audio speaker, etc. In some embodiments, a transmitter/receiver (also referred to as transceiver) 412 may be disposed in connection with the processor 404. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 404 may be disposed in communication with a communication network 414 via a network interface 416. The network interface 416 may communicate with the communication network 414. The network interface 416 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 414 may include, without limitation, a direct interconnection, local area network (LAN), wide area network (WAN), wireless network (e.g., using Wireless Application Protocol), the Internet, etc. Using the network interface 416 and the communication network 414, the computer system 402 may communicate with devices that are external. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 402 may itself embody one or more of these devices.

In some embodiments, the processor 404 may be disposed in communication with one or more memory devices (e.g., RAM, ROM, etc.) of a memory 420 via a storage interface 418. The storage interface 418 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory 420 may store a collection of program or database components, including, without limitation, an operating system 422, user interface application 424, web browser 426, etc. The operating system 422 may facilitate resource management and operation of the computer system 402. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 424 may facilitate display, execution, interaction, manipulation, or operation of program components through textual or graphical facilities. For example, user interfaces may provide computer interaction interface elements on a display system operatively connected to the computer system 402, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 402 may implement a web browser 426 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 402 may implement a mail server stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 402 may implement a mail client stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 402 may store user/application data, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of identifying products. The method and system increase accuracy of product identification with reduced computation complexity. The method and system enable upstream analytics as effective tracking helps to evaluate quality of the products. The method and system provide continuous learning to improve product identification.

As will be appreciated by those skilled in the art, the techniques described in the various embodiments discussed above are not routine, or conventional, or well understood in the art. The techniques discussed above provide for identifying products using digital fingerprints.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described a method and system for identifying products using digital fingerprints. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of identifying products using digital fingerprints, the method comprising:
   receiving, by a product tracking system, a set of images corresponding to a product, wherein the set of images are received along with associated context information;
   generating, by the product tracking system, a set of standardized images by pre-processing the set of images, wherein the generating the set of standardized images comprises extracting a product identifier (ID) corresponding to the product from the set of images;
   segmenting, by the product tracking system, each standardized image of the set of standardized images into a plurality of zones;
   generating, by the product tracking system, a zone wise fingerprint for each zone of the plurality of zones, wherein the generating the zone wise fingerprint for each zone of the plurality of zones comprises assigning weights to the plurality of zones based on historical data; and generating the zone wise fingerprint for each zone based on the product ID, zone information, and associated zone weightage information; and
   generating, by the product tracking system, a product digital fingerprint for the product by combining zone wise fingerprints associated with the set of standardized images, wherein the product digital fingerprint identifies the product.

2. The method of claim 1, wherein the set of images are pre-processed using geometric image standardization methods.

3. The method of claim 1, further comprising:
   maintaining a master repository of product digital fingerprints of one or more products.

4. The method of claim 3, further comprising:
identifying, by the product tracking system, the product by comparing the product digital fingerprint of the product against the product digital fingerprints available in the master repository.

5. The method of claim 4, further comprising:
verifying, by the product tracking system, accuracy of product identification, of the product; and
modifying, by the product tracking system, a set of parameters associated with the product tracking system based on the verification of accuracy.

6. A product tracking system for identifying products using digital fingerprints, the product tracking system comprising:
a processor; and
a memory communicatively coupled to the processor, wherein the memory stores processor instructions, which, on execution, cause the processor to:
receive a set of images corresponding to a product, wherein the set of images are received along with associated context information;
generate a set of standardized images by pre-processing the set of images by extracting a product identifier (ID) corresponding to the product from the set of images;
segment each standardized image of the set of standardized images into a plurality of zones;
generate a zone wise fingerprint for each zone of the plurality of zones by assigning weights to the plurality of zones based on historical data; and generating the zone wise fingerprint for each zone based on the product ID, zone information, and associated zone weightage information; and
generate a product digital fingerprint for the product by combining zone wise fingerprints associated with the set of standardized images, wherein the product digital fingerprint identifies the product.

7. The product tracking system of claim 6, wherein the set of images are pre-processed using geometric image standardization methods.

8. The product tracking system of claim 6, wherein the processor instructions further cause the processor to:
maintain a master repository of product digital fingerprints of one or more products.

9. The product tracking system of claim 8, wherein the processor instructions further cause the processor to:
identify the product by comparing the product digital fingerprint of the product against the product digital fingerprints available in the master repository.

10. The product tracking system of claim 9, wherein the processor instructions further cause the processor to:
verify accuracy of identification of the product; and
modify a set of parameters associated with the product tracking system based on the verification of accuracy.

11. A non-transitory computer-readable storage medium for identifying products using digital fingerprints, having stored thereon, a set of computer-executable instructions causing a computer comprising one or more processors to perform steps comprising:
receiving a set of images corresponding to a product, wherein the set of images are received along with associated context information;
generating a set of standardized images by pre-processing the set of images by extracting a product identifier (ID) corresponding to the product from the set of images;
segmenting each standardized image of the set of standardized images into a plurality of zones;
generating a zone wise fingerprint for each zone of the plurality of zones by assigning weights to the plurality of zones based on historical data and generating the zone wise fingerprint for each zone based on the product ID, zone information, and associated zone weightage information; and
generating a product digital fingerprint for the product by combining zone wise fingerprints associated with the set of standardized images, wherein the product digital fingerprint identifies the product.

12. The non-transitory computer-readable storage medium of claim 11, wherein the set of images are pre-processed using geometric image standardization methods.

13. The non-transitory computer-readable storage medium of claim 11, further comprising:
maintaining a master repository of product digital fingerprints of one or more products.

14. The non-transitory computer-readable storage medium of claim 13, further comprising:
identifying the product by comparing the product digital fingerprint of the product against the product digital fingerprints available in the master repository;
verifying accuracy of identification of the product; and
modifying a set of parameters associated with the product tracking system based on the verification of accuracy.

* * * * *